US010512388B2

(12) United States Patent
Noriega et al.

(10) Patent No.: US 10,512,388 B2
(45) Date of Patent: *Dec. 24, 2019

(54) DISHWASHER WITH CONDENSING DRYING SYSTEM

(71) Applicant: Whirlpool Corporation, Benton Harbor, MI (US)

(72) Inventors: Alvaro Vallejo Noriega, Saint Joseph, MI (US); Subhash N. Varvate, Maharashtra (IN); Patrick J. Duffy, Chicago, IL (US); Gautam P. Kamat, Maharashtra (IN); Thomas M. DeLellis, Southfield, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 31 days.

This patent is subject to a terminal disclaimer.

(21) Appl. No.: 15/884,562

(22) Filed: Jan. 31, 2018

(65) Prior Publication Data

US 2018/0146836 A1 May 31, 2018

Related U.S. Application Data

(63) Continuation of application No. 15/091,637, filed on Apr. 6, 2016, now Pat. No. 9,943,211.

(51) Int. Cl.
*B01D 45/06* (2006.01)
*B01D 45/08* (2006.01)
(Continued)

(52) U.S. Cl.
CPC ......... *A47L 15/483* (2013.01); *A47L 15/0013* (2013.01); *A47L 15/22* (2013.01);
(Continued)

(58) Field of Classification Search
CPC ......... B01D 45/06; B01D 45/08; A47L 15/00; A47L 15/42; A47L 15/48; A47L 15/50;
(Continued)

(56) References Cited

U.S. PATENT DOCUMENTS 3,026,628 A 3/1962 Berger, Sr. et al.
3,534,565 A 10/1970 Osborne
(Continued)

FOREIGN PATENT DOCUMENTS

DE 19946456 A1 4/2001
EP 1447042 A1 8/2004
(Continued)

*Primary Examiner* — Minh Chau T Pham
(74) *Attorney, Agent, or Firm* — McGarry Bair PC

(57) ABSTRACT

A dish treating appliance can include a tub at least partially defining a treating chamber and having an access opening providing access to the treating chamber, a closure selectively closing the access opening, a condenser including an inlet, an outlet, and a condensing passage defining a serpentine path with multiple turns fluidly coupling the inlet and the outlet, with the inlet fluidly coupled to the treating chamber, the outlet fluidly coupled to ambient air, and multiple ambient air inlets provided in the serpentine path, and a blower fluidly coupled to the condenser flowing a volume of air through the serpentine path of the condenser, and at least one separator wall located within the condenser.

20 Claims, 7 Drawing Sheets

(51) Int. Cl.
*A47L 15/00* (2006.01)
*A47L 15/42* (2006.01)
*A47L 15/48* (2006.01)
*A47L 15/50* (2006.01)
*D06F 25/00* (2006.01)
*D06F 33/02* (2006.01)
*D06F 39/00* (2006.01)
*D06F 58/20* (2006.01)
*A47L 15/22* (2006.01)
*B01D 53/26* (2006.01)

(52) U.S. Cl.
CPC ....... *A47L 15/4261* (2013.01); *A47L 15/4285* (2013.01); *A47L 15/4293* (2013.01); *A47L 15/486* (2013.01); *A47L 15/488* (2013.01); *A47L 15/502* (2013.01); *A47L 15/507* (2013.01); *B01D 53/265* (2013.01)

(58) Field of Classification Search
CPC .......... D06F 25/00; D06F 33/02; D06F 39/00; D06F 58/20
USPC ........ 55/385.1, 410–415; 134/14, 107, 56 D; 165/111, 113
See application file for complete search history.

(56) References Cited

U.S. PATENT DOCUMENTS

| | | | |
|---|---|---|---|
| 3,811,252 A * | 5/1974 | Evans | B01D 45/08 |
| | | | 261/109 |
| 5,135,550 A | 8/1992 | Telchuk et al. | |
| 5,377,489 A | 1/1995 | Silvestri, Jr. et al. | |
| 6,241,009 B1 | 6/2001 | Rush | |
| 7,909,939 B2 | 3/2011 | Brewer et al. | |
| 9,943,211 B2 * | 4/2018 | Noriega | A47L 15/483 |
| 2006/0231122 A1 | 10/2006 | Stelzer et al. | |
| 2007/0251552 A1 * | 11/2007 | Lee | A47L 15/4251 |
| | | | 134/56 D |
| 2009/0038654 A1 | 2/2009 | Kim | |
| 2013/0333684 A1 | 12/2013 | Cescot et al. | |
| 2017/0028447 A1 | 2/2017 | Cagnasso et al. | |

FOREIGN PATENT DOCUMENTS

| | | |
|---|---|---|
| EP | 2286708 A2 | 2/2011 |
| GB | 2210256 A | 6/1989 |
| GB | 2308431 A | 6/1997 |

* cited by examiner

DISHWASHER WITH CONDENSING DRYING SYSTEM

CROSS REFERENCE TO RELATED APPLICATIONS

This application is a continuation of U.S. application Ser. No. 15/091,637, filed Apr. 6, 2016, issued on Apr. 17, 2018 as U.S. Pat. No. 9,943,211, entitled "Dishwasher with Condensing Drying System", which is incorporated herein by reference in its entirety.

BACKGROUND OF THE INVENTION

Automatic dishwashers for use in a typical household include a tub defining a treating chamber and a spraying system for recirculating liquid throughout the tub to remove soils from the dishes and utensils. Two common configurations are a door-type, where a pivoting door provides access to a treating chamber where dishes are washed or a drawer-type where a drawer provides access to the as well as defining a major portion of the treating chamber. In either configuration, a rack for holding dishes to be cleaned is typically provided within the treating chamber.

Typical automatic dishwashers generally include a drying cycle which can include heating the treating chamber to evaporate a part of liquid used to wash or rinse the dishes and can include a condenser to further remove humidity from the humid air within the treating chamber. Typical condensers highly depend on the temperature difference between the humid air and the condenser walls. A reduction in this temperature difference reduces condenser efficiency. Furthermore, typical condensers require an additional conduit and inlet to provide a condensed liquid back to the treating chamber for removal by the pump.

Further still, some automatic dishwashers can allow an amount of steam to escape through inlets such as a water inlet. The escaping steam can damage internal components or soak an internal sound blanket, requiring watertight sealing or plastic wrapping to preventing water damage from the escaping steam.

BRIEF DESCRIPTION OF THE INVENTION

In one aspect, the present disclosure relates to a dish treating appliance for treating dishes according to an automatic cycle of operation, the dish treating appliance including a tub at least partially defining a treating chamber and having an access opening providing access to the treating chamber, a closure selectively closing the access opening, a condenser comprising an inlet, an outlet, and a condensing passage defining a serpentine path with multiple turns fluidly coupling the inlet and the outlet, with the inlet fluidly coupled to the treating chamber, the outlet fluidly coupled to ambient air, and multiple ambient air inlets provided in the serpentine path, and a blower fluidly coupled to the condenser flowing a volume of air through the serpentine path of the condenser, and at least one separator wall located within the condenser to at least partially form multiple flow paths through the condenser, wherein the multiple ambient air inlets provided in the serpentine path reduce an overall humidity of the volume of air flowing through the serpentine path while simultaneously condensing humidity from the volume of air in the condensing passage.

In another aspect, the present disclosure relates to a dish treating appliance for treating dishes according to an automatic cycle of operation, the dish treating appliance including a tub at least partially defining a treating chamber and having an access opening providing access to the treating chamber, a closure selectively closing the access opening, a condenser comprising an inlet, an outlet, and a condensing passage defining a serpentine path with multiple turns fluidly coupling the inlet and the outlet, with the inlet fluidly coupled to the treating chamber, the outlet fluidly coupled to ambient air, and multiple ambient air inlets provided in the serpentine path, and a blower fluidly coupled to the condenser flowing a volume of air through the serpentine path of the condenser, and a plurality of separator walls disposed at a junction of the inlet and the condensing passage to at least partially form multiple flow paths through the condenser, wherein the multiple ambient air inlets provided in the serpentine path reduce an overall humidity of the volume of air flowing through the serpentine path while simultaneously condensing humidity from the volume of air in the condensing passage.

DESCRIPTION OF EMBODIMENTS OF THE INVENTION

Figure 1:
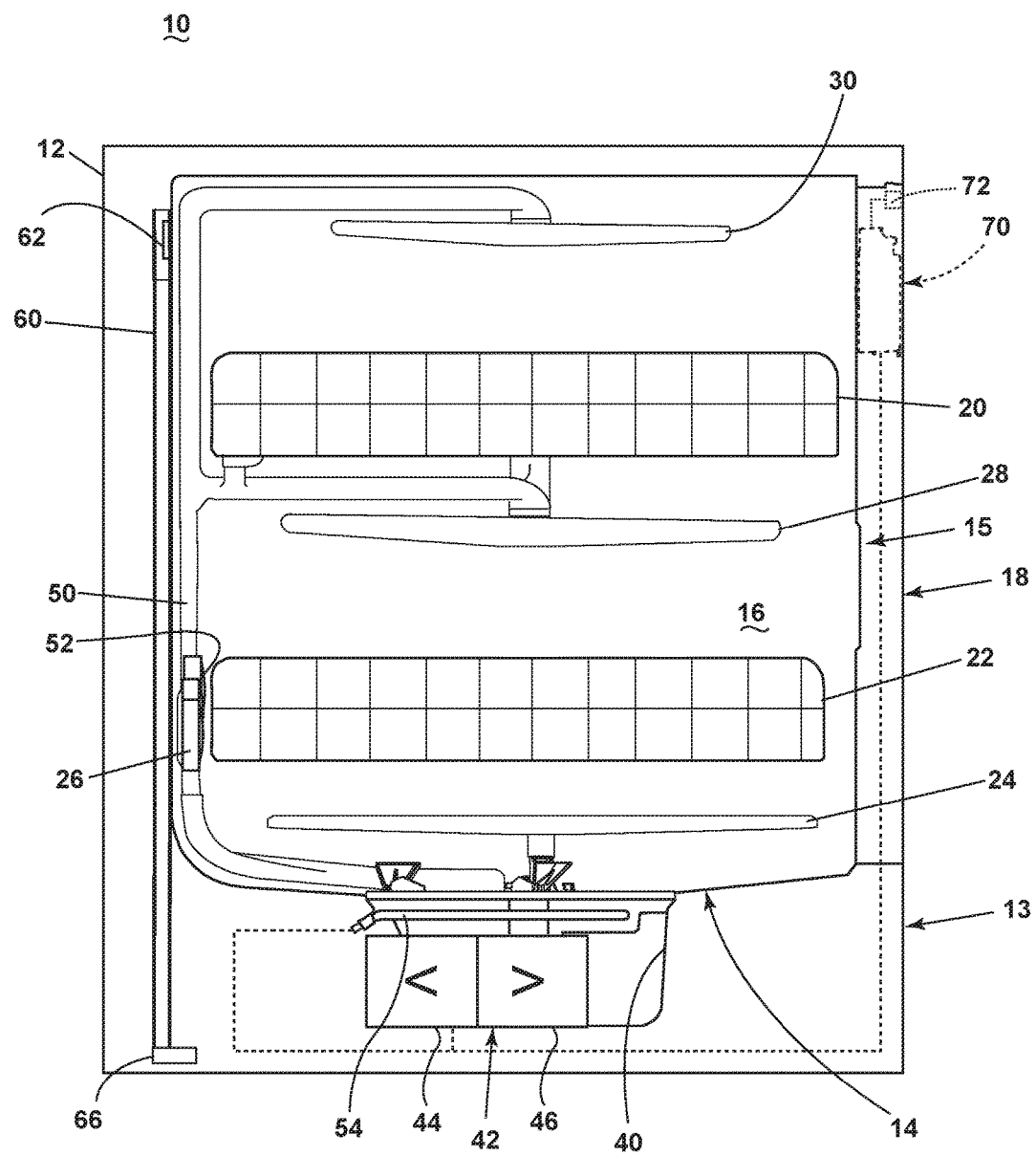
FIG. 1 is a schematic, cross-sectional view of a dishwasher with a condenser.

In FIG. 1, an automated dishwasher 10 comprises a chassis 12 to define an interior of the dishwasher 10 and can include a frame, with or without panels mounted to the frame. A tub 14 can be provided within the chassis 12 and can at least partially define a treating chamber 16, having an open face, for washing dishes. A closure such as a door assembly 18 can be movably mounted to the dishwasher 10 for movement between opened and closed positions to define an access opening for selectively opening and closing the access opening. Thus, the door assembly 18 provides accessibility to the treating chamber 16 through the access opening for the loading and unloading of dishes or other washable items. It should be appreciated that the door assembly 18 can be secured to the lower front edge of the chassis 12 or to the lower front edge of the tub 14 via a hinge assembly (not shown) configured to pivot the door assembly 18. When the door assembly 18 is closed, user access to the treating chamber 16 can be prevented, whereas user access to the treating chamber 16 can be permitted when the door assembly 18 is open.

The chassis 12 can further comprise a bottom panel 13 disposed beneath the pivot point of the door assembly 18. The door assembly 18 is exemplarily shown in a closed position, but can be selectably opened to provide access to the treating chamber through an access opening 15.

Dish holders, illustrated in the form of upper and lower dish racks 20, 22, are located within the treating chamber 16 and receive dishes for washing. The upper and lower racks 20, 22 are typically mounted for slidable movement in and out of the treating chamber 16 for ease of loading and unloading. Other dish holders can be provided, such as a silverware basket. As used in this description, the term "dish(es)" is intended to be generic to any item, single or plural, that can be treated in the dishwasher 10, including, without limitation, dishes, plates, pots, bowls, pans, glassware, and silverware.

A spray system is provided for spraying liquid in the treating chamber 16 and is provided in the form of a first lower spray assembly 24, a second lower spray assembly 26, a rotating mid-level spray arm assembly 28, and/or an upper spray arm assembly 30. Upper sprayer 30, mid-level rotatable sprayer assembly 28 and lower rotatable sprayer assembly 24 are located, respectively, above the upper rack 20, beneath the upper rack 20, and beneath the lower rack 22 and are illustrated as rotating spray arms. The second lower spray assembly 26 is illustrated as being located adjacent the lower dish rack 22 toward the rear of the treating chamber 16. The second lower spray assembly 26 is illustrated as including a vertically oriented distribution header or spray manifold 52. Such a spray manifold is set forth in detail in U.S. Pat. No. 7,594,513, issued Sep. 29, 2009, and titled "Multiple Wash Zone Dishwasher," which is incorporated herein by reference in its entirety.

A recirculation system is provided for recirculating liquid from the treating chamber 16 to the spray system. The recirculation system can include a sump 40 and a pump assembly 42. The sump 40 collects the liquid sprayed in the treating chamber 16 and can be formed by a sloped or recessed portion of a bottom wall of the tub 14. The pump assembly 42 can include both a drain pump 44 and a recirculation pump 46. The drain pump 44 can draw liquid from the sump 40 and pump the liquid out of the dishwasher 10 to a household drain line (not shown). The recirculation pump 46 can draw liquid from the sump 40 and the liquid can be simultaneously or selectively pumped through a supply tube 50 to each of the assemblies 24, 26, 28, 30 for selective spraying. While not shown, a liquid supply system can include a water supply conduit coupled with a household water supply for supplying water to the treating chamber 16. A heating system including a heater 54 can be located within the sump 40 for heating the liquid contained in the sump 40 or heating the dishwasher during a drying cycle, for example.

A condenser 60 can be provided between the chassis 12 and the tub 14, extending along a portion of the tub 14. The condenser 60 can mount to the chassis 12 or the tub 14, such as by fastening with fasteners or by welding. A condenser inlet 62 can provide fluid communication between the treating chamber 16 and the condenser 60. A condenser outlet 66 is exemplarily provided near the bottom of the dishwasher 10 for exhausting air from the condenser 60 external of the dishwasher 10.

A controller 70 can also be included in the dishwasher 10, which can be operably coupled with various components of the dishwasher 10 to implement a cycle of operation. The controller 70 can be located within the door 18 as illustrated, or it can alternatively be located somewhere within the chassis 12. The controller 70 can also be operably coupled with a control panel or user interface 72 for receiving user-selected inputs and communicating information to the user. The user interface 72 can include operational controls such as dials, lights, switches, and displays enabling a user to input commands, such as a cycle of operation, to the controller 70 and receive information.

Figure 2:
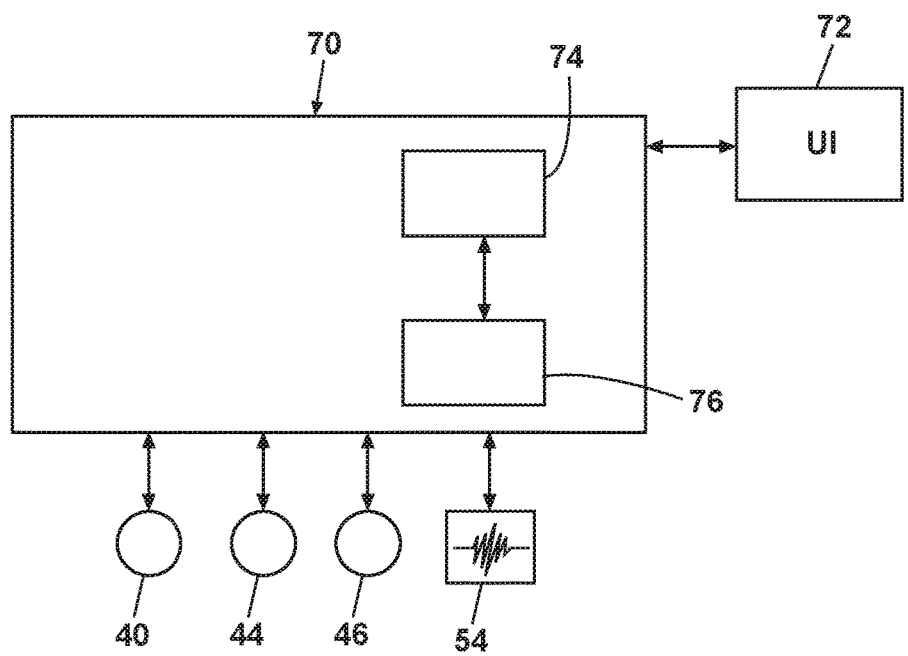
FIG. 2 is a schematic view of a controller of the dishwasher of FIG. 1.

As illustrated schematically in FIG. 2, the controller 70 can be coupled with the heater 54 for heating the wash liquid during a cycle of operation, the drain pump 44 for draining liquid from the treating chamber 16, and the recirculation pump 46 for recirculating the wash liquid during the cycle of operation. The controller 70 can be provided with a memory 74 and a central processing unit (CPU) 76. The memory 74 can be used for storing control software that can be executed by the CPU 76 in completing a cycle of operation using the dishwasher 10 and any additional software. For example, the memory 74 can store one or more pre-programmed cycles of operation that can be selected by a user and completed by the dishwasher 10. The controller 70 can also receive input from one or more sensors 78. Non-limiting examples of sensors that can be communicably coupled with the controller 70 include a temperature sensor and turbidity sensor to determine the soil load associated with a selected grouping of dishes, such as the dishes associated with a particular area of the treating chamber.

Figure 3:
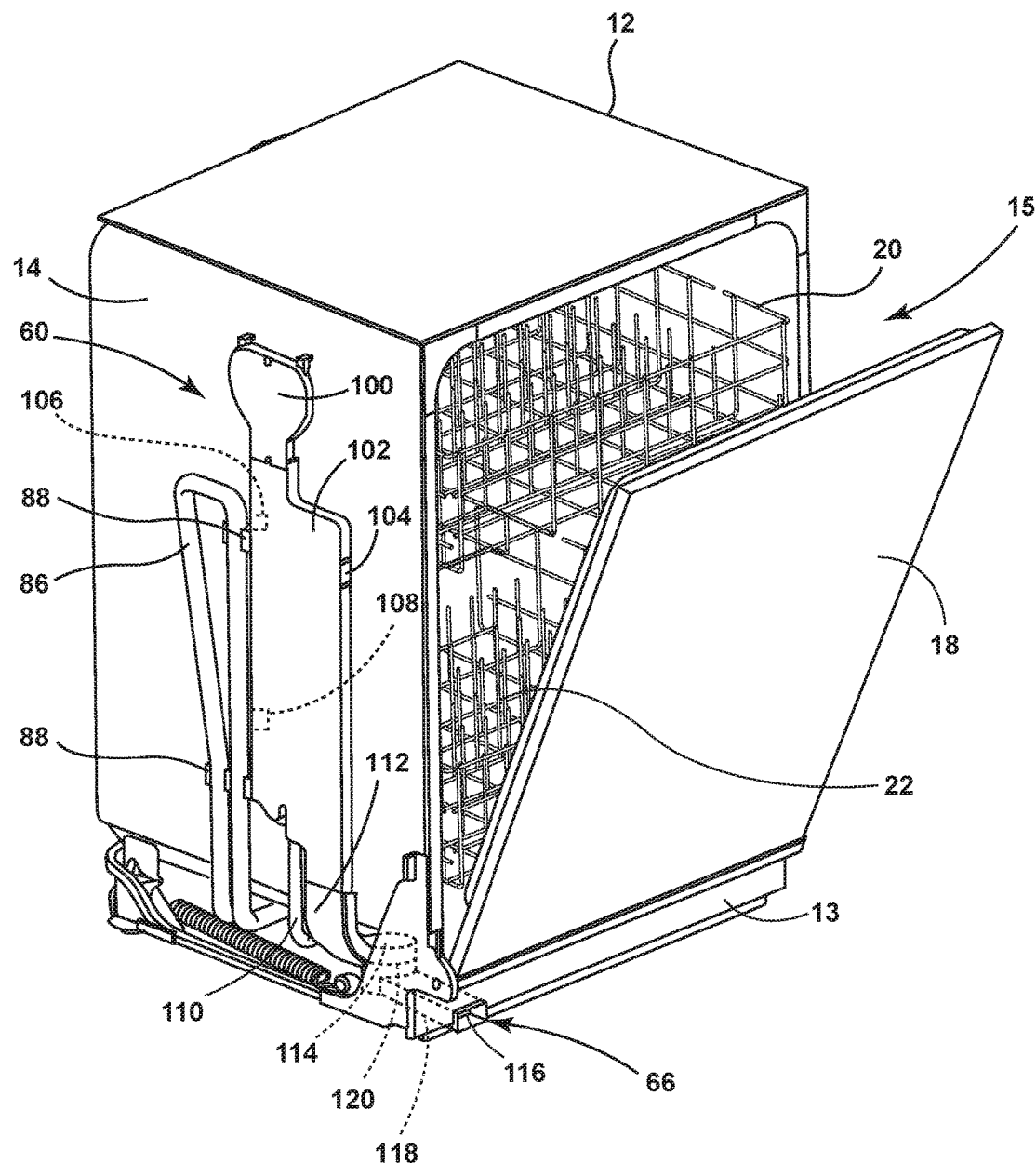
FIG. 3 is a top perspective view of the dishwasher of FIG. 1 with a sidewall of the dishwasher removed illustrating the condenser.

Turning to FIG. 3, the chassis 12 is illustrated as having a side panel of the chassis 12 removed, better illustrating the condenser 60 mounted to the side of the tub 14. A drain conduit 86 is mounted by mounts 88 adjacent to the condenser 60. The condenser 60 runs along the side of the tub 14 and curves underneath the tub 14 to couple to the condenser outlet 66.

Figure 4:
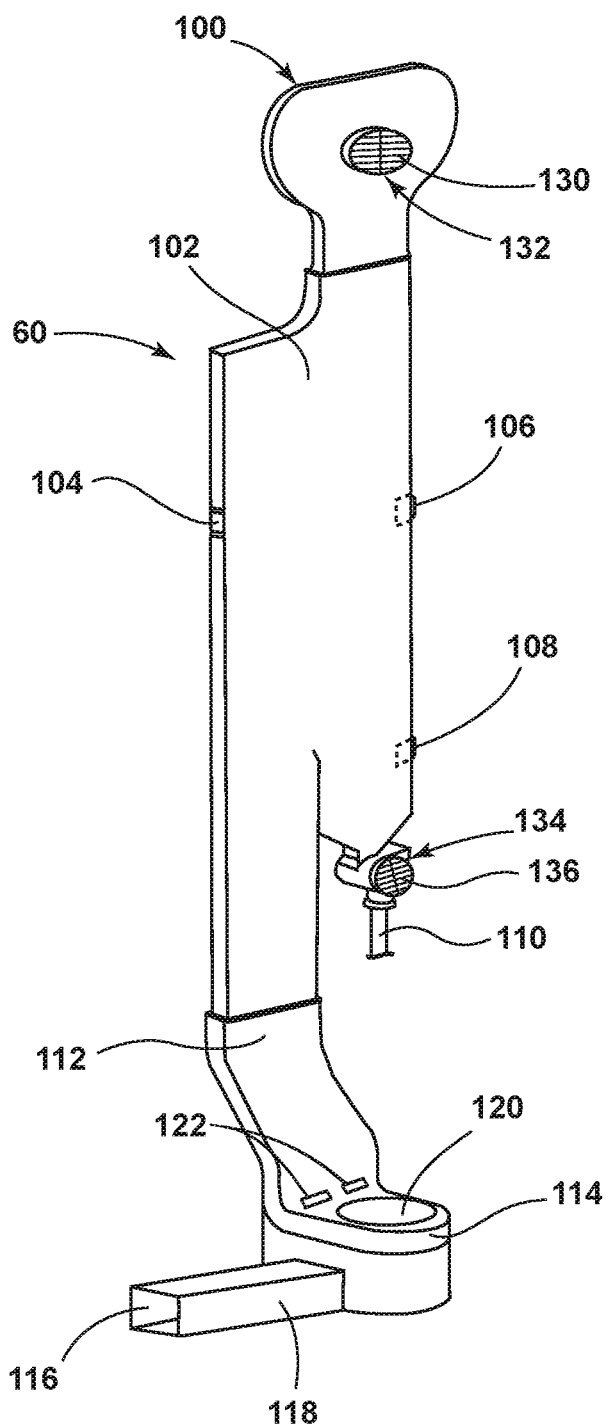
FIG. 4 is a rear perspective view of the condenser of FIG. 3 illustrating an air outlet and a water inlet.

Best seen in FIG. 4, the condenser 60 comprises an inlet section 100 coupled to a condenser conduit or a condensing passage 102. The condensing passage 102 comprises a first ambient air inlet 104, a second ambient air inlet 106, and a siphon break 108. A water supply conduit 110 and an exhaust conduit 112 couple to the bottom of the condenser 60 opposite of the inlet section 100. The exhaust conduit 112 couples the condensing passage 102 to an outlet 116 through a blower housing 114. The blower housing 114 can comprise an exhaust mixing conduit 118 disposed between the blower housing 114 and the outlet 116.

The inlet section 100 fluidly couples the treating chamber 16 to the condensing passage 102. Additionally, the first and second ambient air inlets 104, 106 provide fluid communication between the condensing passage 102 and an ambient air supply, external of the condenser 60 and the treating chamber 16. The water supply conduit 110 can provide a liquid supply, such as a water supply, to the condenser 60, which can be provided to the treating chamber 16. The siphon break 108, in fluid communication with the inlet housing interior 168, provides for air to be pulled into the water supply conduit 110 in the event that the pressure in the water supply conduit 110 drops below the pressure inside the treating chamber 16, preventing any froth, foam, or soiled water from the treating chamber to be siphoned into the water supply conduit 110, preventing contamination of the water supply conduit or the water supply itself. A blower 120 disposed within the blower housing 114 draws air into the condenser 60 from the treating chamber 16 through the inlet section 100. The blower 120 operates to provide an airflow through the condenser 60 such that the air drawn from the treating chamber 16 passes through the condensing passage 102, to the exhaust conduit 112, and through the blower housing 114 to the exhaust outlet 116. The blower 120 can further provide additional ambient air into the exhaust conduit 112 from external of the condenser 60 through one or more ambient air inlets 122 adjacent the blower 120.

The inlet section 100 further comprises an inlet 130 providing fluid communication between the treating chamber 16 and the condenser 60. The inlet 130 can comprise a vent 132 such that liquid or solid matter are frustrated from entering the inlet section 100 of the condenser 60.

The water supply conduit 110 feeds an inlet housing 134 comprising a condensate outlet 136. Water, such as a household water supply can be provided to the inlet housing 134 from the water supply conduit 110. The inlet housing 134 can mount to the tub 14 to provide water to the treating chamber 16 of the dishwasher 10 through the condensate outlet 136. Additionally, the condensed liquid from the condenser 60 can be provided to the treating chamber 16 through the condensate outlet 136, such that the condensate outlet 136 and the water inlet are integrated into a single unit.

The blower 120 is disposed within the blower housing 114 and can be disposed on the top of the blower housing 114. Alternatively, the blower can be disposed on the sides or bottom of the blower housing 114, such that the blower 120 can be used to both introduce ambient air into the blower housing 114 as well as draw air from the treating chamber 16 and through the condenser 60.

Alternatively, the inlet 130 and the condensate outlet 136 can have a valve to selectively permit air or liquid to pass through them. For example, the inlet 130 and outlet 136 can have a rubber or powered flapper that permits one-directional flow of air or fluids, preventing any unwanted backflow during wash and rinse operations. In alternative examples, any type of valve or mechanical seal can be utilized to selectively open and close the inlet 130 and outlet 136 or to permit unidirectional flow through them.

Figure 5:
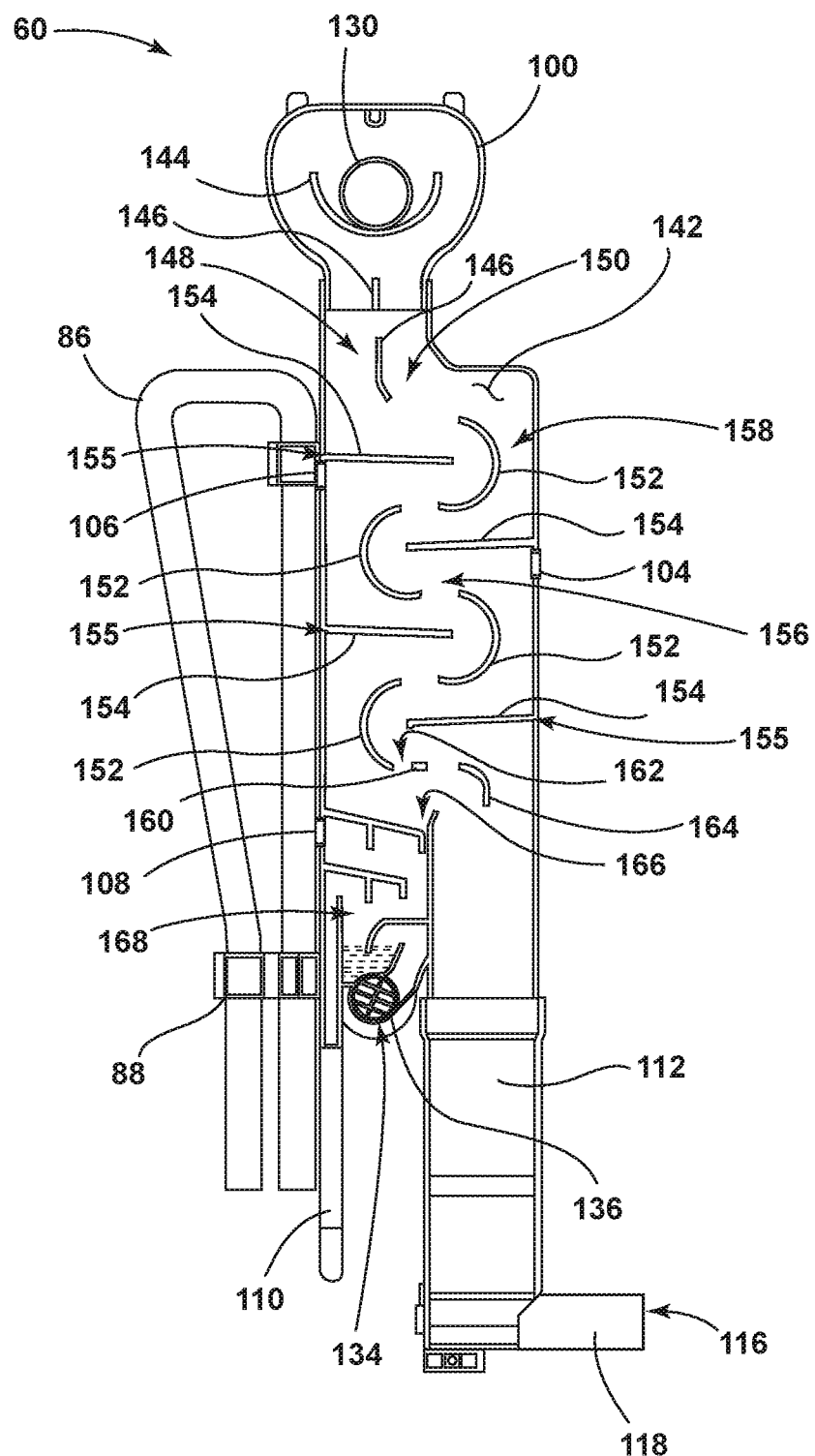
FIG. 5 is a cross-sectional view of the condenser of FIG. 4 illustrating the internal structure of the condenser.

Turning to FIG. 5, a cross-sectional view of the condenser 60 best illustrates an interior 142 of the condenser 60. The inlet section 100 can further comprise an arcuate water wall 144. The water wall 144 is disposed adjacent to the bottom of the inlet 130 such that any liquid splashing into the inlet section 100 can drain back into the treating chamber 16 through the inlet 130 without falling into the interior 142 of the condenser 60. Two separator walls 146 disposed at the junction between the inlet section 100 and the condensing passage 102 divide the condenser 60 into a left conduit 148 and a right conduit 150. The left and right conduit 148, 150 can be best appreciated by the airflow paths illustrated in FIG. 7.

The condensing passage 102 can comprise curved walls 152 and angled walls 154 disposed therein. The angled walls 154 mount to the sides of the condenser at a junction 155 and are slightly declined at an angle toward the center of the condensing passage 102. The angled walls define a pass 156 formed by the angled walls 154 within the interior 142. The curved walls 152 are spaced from the ends of the angled walls 154, such that each angled wall 154 has a complementary curved wall 152. The curved walls 152 define a turn 158 within the interior 142. The combination of the passes 156 and the turns 158 can define the left and right conduits 148, 150 throughout the interior 142, which define a serpentine path through the condenser 60.

The first and second ambient air inlets 104, 106 are disposed beneath the junctions 155 of the first and second angled walls 154 at the top of the condenser 60. The first ambient air inlet 104 is disposed on the right side of the condenser 60 and the second ambient air inlet 106 is disposed on the left, as illustrated. As such, both the left and right conduits 148, 150 are in fluid communication with the ambient air. It should be appreciated that the position and number of the ambient air inlets 104, 106 is exemplary. More ambient air inlets are contemplated and can be positioned at any position on the condensing passage 102, such that the interior 142 is in fluid communication with the ambient air.

A lower wall 160 is disposed below the bottom-most angled wall 152 and defines a drip aperture 162 between the end of the bottom-most curved wall 154. A turning wall 164 is disposed below the other walls, comprising half of a curved wall 152 for turning the left and right conduits 148, 150 toward the exhaust conduit 112.

The inlet housing 134 further comprises a drip inlet 166. The inlet housing 134 can further comprise an inlet housing interior 168 in fluid communication with the interior 142 of the condenser 60 through the drip inlet 166. The interior 142 and the inlet housing interior 168 are further in fluid communication with the area external of the condenser 60 through the siphon break 108.

Figure 6:
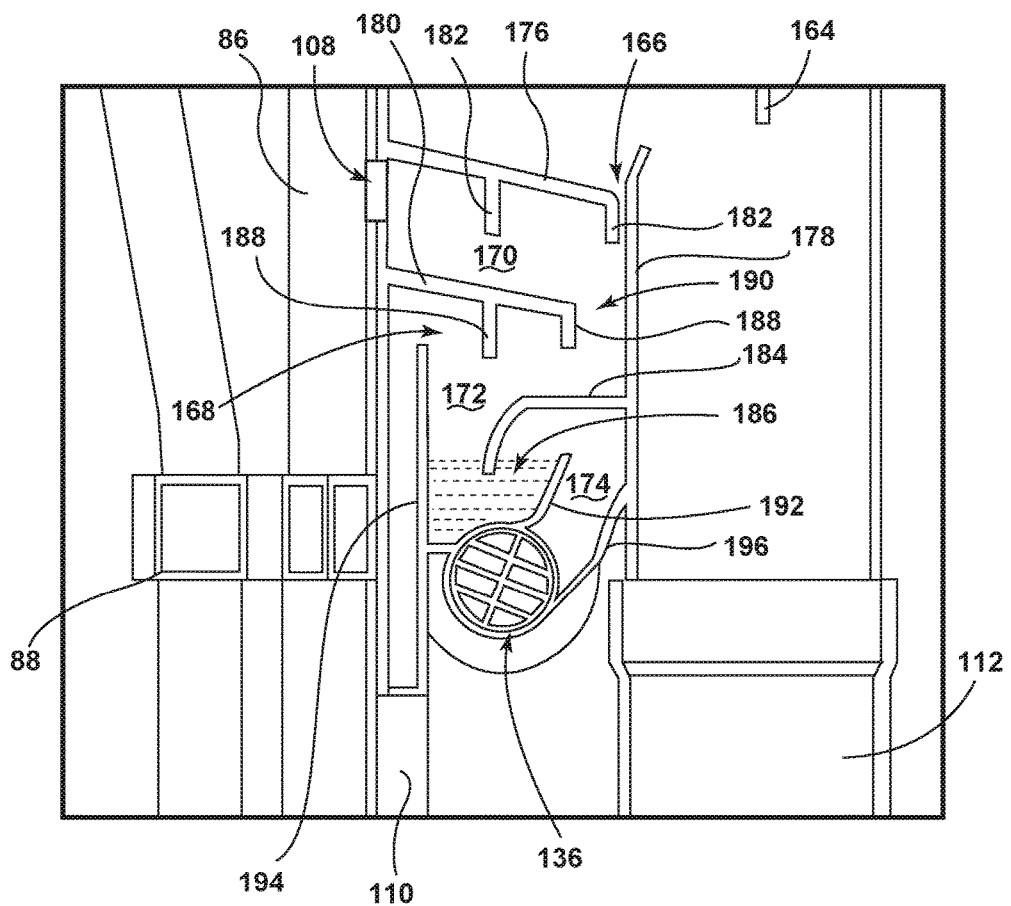
FIG. 6 is close-up, cross-sectional view of a water inlet section of the condenser of FIG. 5.

Turning to FIG. 6, a close-up view illustrates the inlet housing interior 168 separated into a siphon area 170, an inlet area 172, and an outlet passage 174. An upper wall 176, a shared wall 178, the condenser wall at the siphon break 108, and a middle wall 180 define the siphon area 170. The upper wall 176 further comprises two extensions 182 extending into the siphon area 170. The siphon area 170 is in fluid communication with the condenser interior 142 through the drip inlet 166 and external of the condenser 60 through the siphon break 108. The end of the upper wall 176 adjacent to the shared wall 178 also comprises one extension 182 defines the drip inlet 166.

The inlet area 172 is defined by the middle wall 180, the shared wall 178, and a bottom wall 184. The inlet area 172 is in fluid communication with the siphon area 170, the water supply conduit 110, and a water trap 186. As such, any liquid or water pumped from the water supply conduit 110 to the water trap 186 will pass through the inlet area 172. The middle wall 180 further comprises a set of two extensions 188. The extension 188 nearest to the shared wall 178 defines a drip channel 190 providing for fluid to fall from the drip inlet 166 into the inlet area 172 where it can flow to the water trap 186.

The outlet passage 174 is disposed below the inlet area 172 on the opposite side of the water trap 186. The water trap 186 can be further defined by a trap wall 192 and a water inlet wall 194. The outlet passage 174 is defined by the bottom wall 184, the trap wall 192, a passage wall 196, and the shared wall 178, providing fluid communication between the water trap 186 and the condensate outlet 136.

It can be appreciated that the interior 142 of the condenser is in fluid communication with the condensate outlet 136 through the drip inlet 166, the siphon area 170, the inlet area 172, and the outlet passage 174. Furthermore, the water inlet conduit 110 is integrated with the interior 142 of the condenser 60 at the inlet area 172, such that the condensed liquid from the condenser 60 and the water supply are integrated into the same condensate outlet 136 to provide both a water supply and condensed moisture from the condenser 60 to the treating chamber 16.

Figure 7:
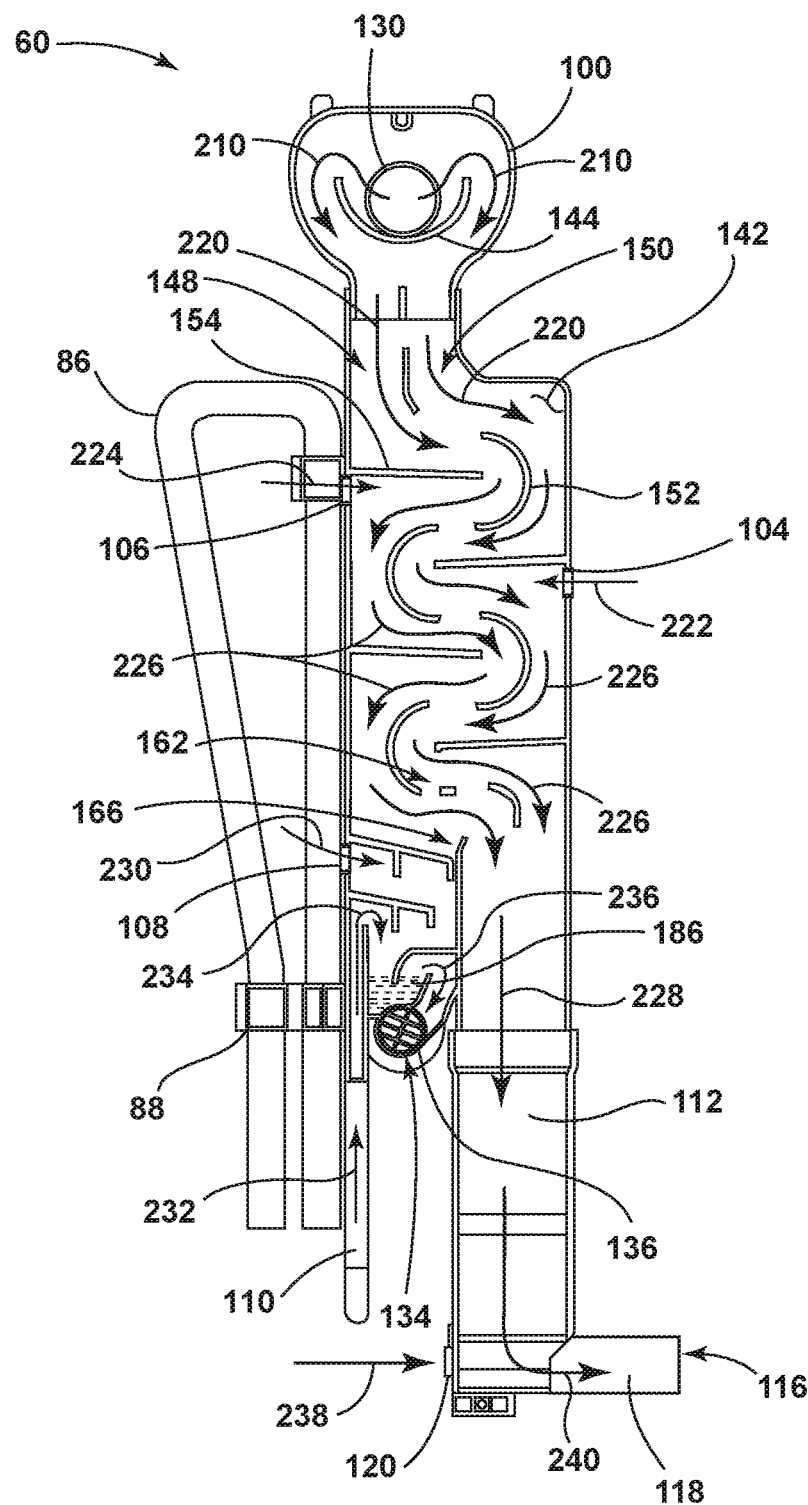
FIG. 7 is the cross-sectional view of FIG. 5 illustrating the airflow path within the condenser.

Turning to FIG. 7, the operation of the condenser 60 can be described and the flow of air within the condenser can be appreciated. A humid airflow 210 draws into the condenser inlet section 100 through the inlet 130 from the treating chamber 16. The airflow initially is directed upward in order to turn around the water wall 144, such that any splashing or dripping water can return into the treating chamber 16 through the inlet 130. A condensing airflow 220 moves into the interior 142 of the condensing passage 102, being separated into two flow paths within the left conduit 148 and the right conduit 150. A first ambient airflow 222 is introduced into the airflow in the right conduit 150, mixing the humid airflow with the ambient air to reduce overall humidity. A second ambient airflow 224 is integrated with the flow in the left conduit 148, mixing the ambient air with the humid air to reduce overall humidity in the left conduit 148. As such, the air moving within the interior 142 downstream of the ambient air inlets 104, 106 comprises a mixed airflow 226.

The mixed air 226 in both conduits 148, 150 draws through the serpentine path of the interior 142 defined by the curved walls 152 and the angled walls 154. As the humid air 210, the condensing airflow 220, and the mixed airflow 226 flows through the interior 142, the air will condense on the walls of the condenser 60 into a liquid. The liquid can drip down the walls until reaching the bottom angled wall 154, where the liquid will drip through the drip aperture 162 and into the inlet housing interior 168 of the inlet housing 134 through the drip inlet 166. Within the inlet housing 134, the dripping liquid can flow into the water trap 186 where it can flow back into the treating chamber 16 through the condensate outlet 136 for removal from the system by the drain pump 44, for example.

The siphon break allows for air to be drawn into the water supply conduit 110 if the pressure in the water supply conduit 110 drops below the pressure inside the treating chamber 16, which can otherwise draw froth, foam or soiled water from the treating chamber 16. Additionally, any air flowing into the water supply conduit through the inlet housing interior 168 can be drawn from the siphon break airflow 230. As such, a water flow 232 can be provided through the water supply conduit as a water supply 234, which is provided to the water trap 186. As water is added to the water trap 186 from the water flow 232, a flow of spilled water 236 from the water trap 186 spills into the outlet passage 174 where the spilled water 236 can flow into the treating chamber 16 through the condensate outlet 136. It should be appreciated that the water trap 186 further provides protection from any humid air or steam escaping from the treating chamber 16 through the condensate outlet 136 from passing into the interior area of the chassis 12 through the siphon break 108. Any such steam or humid air escaping form the treating chamber 16 will condense into the liquid within the water trap 186. Thus, the amount of plastic wrapping or water proofing for components within the chassis 12 is minimized.

External of the inlet housing 134, the mixed air 226 flowing from the interior 142 of the condenser 60 can pass into the exhaust conduit 112 as an exhaust airflow 228. The blower 120 can introduce additional ambient air 238 into the exhaust airflow 228 creating a mixed exhaust airflow 240. The mixed exhaust airflow 240 can be exhausted through the exhaust outlet 116 having an amount of humidity removed by the condenser 60 as well as the overall humidity within the air reduced through multiple mixtures with ambient air.

A method for condensing moisture from moisture-laden air within the treating chamber of the dishwasher can comprise passing the moisture-laden air through a condenser conduit and introducing ambient air into the condenser conduit at multiple locations along the condenser conduit. Passing moisture-laden air through the condenser conduit can comprise drawing the humid air from the treating chamber and into the condensing passage with the blower or drawing humid air from the treating chamber and forcing it through the condensing passage. The moisture-laden air can flow from the condensing passage to the exhaust conduit and out through the outlet. Introducing ambient air into the condenser conduit at multiple locations along the condenser conduit can comprise utilizing ambient air inlets to provide ambient air to the condenser. Multiple ambient air inlets can be used to provide ambient air to the condenser conduit at multiple locations downstream of one another or at different passes of the condenser conduit.

It should be appreciated that the condenser as disclosed is beneficial in providing ambient air to the condenser from multiple sources along the condenser to mix with the humid air, reducing overall humidity of the air as well as simultaneously condensing the humidity from the air at the condenser walls. The ambient air feeds into interior of the condenser at multiple positions to create mixed air as well as further mixing with the mixed air downstream from the condenser at the blower to further reduce the overall humidity of the air before exhausting the air from the system.

It should be further appreciated that the water inlet is integrated with the condenser outlet, such that any liquid condensed within the condenser is provided back into the treating chamber of the dishwasher through the water inlet for removal from the system, for example, by the drain pump.

It should be further appreciated that water trap provides for preventing any steam or humid air which can escape from the integrated water inlet from escaping through the siphon break which can soak internal dishwasher components or develop leakage which can damage areas surrounding the dishwasher unit. Any steam leaking through the water inlet will condense in the water trap system and is prevented from passing to the siphon break. Thus, the need for waterproofing protection such as a plastic wrap for a sound blanket within the dishwasher is minimized or eliminated, saving manufacturing time and cost.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A dish treating appliance for treating dishes according to an automatic cycle of operation, the dish treating appliance comprising:
   a tub at least partially defining a treating chamber and having an access opening providing access to the treating chamber;
   a closure selectively closing the access opening;
   a condenser comprising an inlet, an outlet, and a condensing passage defining a serpentine path with multiple turns fluidly coupling the inlet and the outlet, with the inlet fluidly coupled to the treating chamber, the outlet fluidly coupled to ambient air, and multiple ambient air inlets provided in the serpentine path; and
   a blower fluidly coupled to the condenser flowing a volume of air through the serpentine path of the condenser; and
   at least one separator wall located within the condenser to at least partially form multiple flow paths through the condenser;
   wherein the multiple ambient air inlets provided in the serpentine path reduce an overall humidity of the volume of air flowing through the serpentine path while simultaneously condensing humidity from the volume of air in the condensing passage.

2. The dish treating appliance of claim 1 further comprising at least one curved wall located within the serpentine path to at least partially forming the multiple flow paths in at least one of the multiple turns.

3. The dish treating appliance of claim 2 further comprising an angled wall at least partially forming the multiple flow paths.

4. The dish treating appliance of claim 3 wherein the angled wall extends from a side of the condenser toward the curved wall.

5. The dish treating appliance of claim 4 wherein at least one of the multiple ambient air inlets is located on a downstream side of the angled wall.

6. The dish treating appliance of claim 5 wherein the at least one of the multiple ambient air inlets is located at a junction of the angled wall and side of the condenser.

7. The dish treating appliance of claim 1 further comprising a water wall disposed below the inlet.

8. The dish treating appliance of claim 7 wherein the water wall is disposed upstream of the at least one separator wall.

9. The dish treating appliance of claim 1 further comprising multiple separator walls.

10. The dish treating appliance of claim 9 wherein the multiple separator walls are disposed downstream of each other.

11. The dish treating appliance of claim 1 wherein the at least one separator wall is disposed at a junction of the inlet and the condensing passage.

12. The dish treating appliance of claim 1 further comprising multiple curved walls and multiple angled walls wherein each angled wall has a complementary curved wall.

13. The dish treating appliance of claim 1 further comprising a turning wall disposed adjacent the outlet configured to turn the multiple flow paths towards the outlet.

14. A dish treating appliance for treating dishes according to an automatic cycle of operation, the dish treating appliance comprising:
 a tub at least partially defining a treating chamber and having an access opening providing access to the treating chamber;
 a closure selectively closing the access opening;
 a condenser comprising an inlet, an outlet, and a condensing passage defining a serpentine path with multiple turns fluidly coupling the inlet and the outlet, with the inlet fluidly coupled to the treating chamber, the outlet fluidly coupled to ambient air, and multiple ambient air inlets provided in the serpentine path; and
 a blower fluidly coupled to the condenser flowing a volume of air through the serpentine path of the condenser; and
 a plurality of separator walls disposed at a junction of the inlet and the condensing passage to at least partially form multiple flow paths through the condenser;
 wherein the multiple ambient air inlets provided in the serpentine path reduce an overall humidity of the volume of air flowing through the serpentine path while simultaneously condensing humidity from the volume of air in the condensing passage.

15. The dish treating appliance of claim 14 further comprising at least one curved wall located within the serpentine path to at least partially forming the multiple flow paths in at least one of the multiple turns.

16. The dish treating appliance of claim 15 further comprising an angled wall at least partially forming the multiple flow paths.

17. The dish treating appliance of claim 16 wherein the angled wall extends from a side of the condenser toward the curved wall.

18. The dish treating appliance of claim 17 wherein at least one of the multiple ambient air inlets is located on a downstream side of the angled wall.

19. The dish treating appliance of claim 18 wherein the at least one of the multiple ambient air inlets is located at a junction of the angled wall and side of the condenser.

20. The dish treating appliance of claim 14 further comprising a water wall disposed below the inlet.

* * * * *